United States Patent
Takamatsu

(10) Patent No.: US 6,816,392 B2
(45) Date of Patent: Nov. 9, 2004

(54) OVERCURRENT OUTPUT PROTECTING CIRCUIT AND CONSTANT-VOLTAGE SWITCHING POWER SUPPLY INCORPORATING THE SAME

(75) Inventor: Seiji Takamatsu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 4 days.

(21) Appl. No.: 10/431,572

(22) Filed: May 8, 2003

(65) Prior Publication Data
US 2004/0022074 A1 Feb. 5, 2004

(30) Foreign Application Priority Data
May 8, 2002 (JP) ..................................... P2002-133292

(51) Int. Cl.[7] ............................................. H02M 3/335
(52) U.S. Cl. ...................... 363/21.15; 363/19; 323/902
(58) Field of Search ......................... 363/18, 19, 21.12, 363/21.15, 56.01; 323/902

(56) References Cited

U.S. PATENT DOCUMENTS

| | | | | |
|---|---|---|---|---|
| 5,012,399 A | * | 4/1991 | Takemura et al. ............ | 363/18 |
| 5,661,642 A | * | 8/1997 | Shimashita ............... | 363/21.15 |
| 5,995,382 A | * | 11/1999 | Miyazaki et al. ............. | 363/19 |
| 6,078,508 A | * | 6/2000 | Okamura et al. ............. | 363/19 |
| 6,433,443 B2 | * | 8/2002 | Nishida et al. ............... | 307/35 |
| 6,577,511 B2 | * | 6/2003 | Yamaguchi et al. ...... | 363/21.07 |

FOREIGN PATENT DOCUMENTS

JP 2001-5576 A 1/2001

* cited by examiner

Primary Examiner—Bao Q. Vu
(74) Attorney, Agent, or Firm—Sughrue Mion, PLLC

(57) ABSTRACT

An overcurrent output protector is electrically connected to a constant-voltage switching power supply provided with a switching transistor which converts a DC voltage obtained by smoothing an AC voltage supplied from an AC power source into a cyclic pulse signal. In the overcurrent output protector, duty ratio monitor judges whether an ON duty ratio of the cyclic pulse signal is a predetermined ratio or more. A deactivator turns off the switching transistor in a case where the duty ratio monitor judges that the ON duty ratio is the predetermined ratio or more.

11 Claims, 4 Drawing Sheets

OVERCURRENT OUTPUT PROTECTING CIRCUIT AND CONSTANT-VOLTAGE SWITCHING POWER SUPPLY INCORPORATING THE SAME

BACKGROUND OF THE INVENTION

The present invention relates to an overcurrent output protecting circuit and a constant-voltage switching power supply incorporating the same.

A constant-voltage switching power supply rarely generates unnecessary power as heat from a transistor since a switching transistor therein only repeats the ON-OFF switching operation. The constant-voltage switching power supply uses a compact and small-loss high-frequency transformer. Thus the constant-voltage switching power supply is advantageous in that the power loss of the entire circuit can be made small. FIG. 4 is a circuit diagram showing an example of a related-art constant-voltage switching power supply.

A smoother 1 comprising a rectifier bridge DB1 and a capacitor C11 smoothes the AC voltage supplied from an AC power source Vin to convert the AC voltage to a DC voltage. The DC voltage is switched by a switching transistor (field-effect transistor) Q1 and converted to a high-frequency pulse. The high-frequency pulse is transformed by a high-frequency transformer T1 then converted to a DC voltage again by a high-frequency rectifier 2 and outputted across a Vout terminal and a GND terminal. In a case where there is a variation in the output voltage, the voltage comparator/detector 3 detects a variation in the voltage and notifies that to a duty ratio controller 4 via a photocoupler PC1. The duty ratio controller 4 changes the ON-OFF interval of the switching transistor Q1 to control the duty ratio of the high-frequency pulse. The average voltage of the high-frequency pulse becomes the DC output voltage and the output voltage is controlled by the duty ratio. Control of the duty ratio of the high-frequency pulse is made so that, when the DC output voltage is higher, the ON duty will be smaller and when the DC output voltage is lower, the ON duty will be greater.

In the related-art constant-voltage switching power supply of this configuration, an AC voltage supplied from the AC power source Vin is converted to a DC voltage by the smoother 1, and the DC voltage causes a current to flow through an activation resistor R1, thus elevating the gate voltage of the switching transistor Q1. This turns on the switching transistor Q1 and generates a voltage on a first primary coil of the high-frequency transformer T1 and a phase-inverted voltage corresponding to the number of turns on a second primary coil P2. The voltage generated in the second primary coil applies a positive feedback on the gate of the switching transistor Q1 via a capacitor C1 and a resistor R2. The base of the transistor Q2 is charged by a coupler current of a photocoupler PC1 which feeds back a variation in the DC output voltage and a current flowing through a Zener diode ZD1.

When a current flows through the first primary coil P1, a current attempts to flow through the secondary wiring S1 of the high-frequency transformer T1. The diode D1 blocks the current so that the corresponding energy is stored in the high-frequency transformer T1. When the base voltage of the transistor Q1 reaches the ON voltage, the switching transistor Q1 turns off, causing the energy to be transmitted from the secondary wiring S1. On the second primary coil P2 is applied a reverse bias thus causing the base of the transistor Q2 to be discharged. When all the energy stored in the high-frequency transformer T1 is generated from the secondary wiring S1, the switching transistor Q1 starts to turn on again with a counterelectromotive force.

A high-frequency pulse is generated by repeating the above operation. Then the transistor Q2 is ON-OFF controlled by the coupler current of the photocoupler PC1 which feeds back a variation in the DC output voltage. This causes ON-OFF control of the transistor Q1, which controls the duty ratio of the high-frequency pulse. Thus a voltage specified by a Zener diode ZD2 is stably outputted at the DC output terminal Vout.

FIG. 5 shows the voltage waveform of the primary coils P1 and P2 of the high-frequency transformer T1 and the voltage waveform across the base and the emitter Vbe of the transistor Q2 in the related-art constant-voltage switching power supply. FIG. 6 is a graph showing a relationship between a DC output current Iout and the DC output voltage Vout of the related-art constant-voltage switching power supply.

Decreasing the load on the DC voltage output from infinity to zero increases the current flowing toward a load. This extends the ON duty of the switching transistor Q1 (ON duty of a voltage generated in the first primary coil P1). When a certain length of ON duty is reached, the base of the transistor Q2 is charged even in a case where the photocoupler PC1 is not turned on, which decreases the DC output voltage (point designated by A in FIG. 6). As the DC output voltage decreases, the ON duty voltage of the switching transistor Q1, that is, the ON-duty voltage of a voltage generated in the first primary coil P1 decreases (waveform indicated by a chained line in FIG. 5). This also causes the ON-duty voltage of a voltage generated in the second primary coil P2 to decrease (waveform indicated by a chained line in FIG. 5). The negative bias voltage (Vbe) of the transistor Q2 decreases (waveform indicated by a chained line in FIG. 5), which causes the transistor to tend to turn on.

As the DC output voltage further decreases, the voltage in the second primary coil P2 decreases and drops below the Zener voltage of the Zener diode ZD1, which fails to turn on the transistor Q2. This prevents the transistor Q2 from continuously driving the switching transistor Q1, causing the switching transistor Q1 to start blocking oscillation (point designated by B in FIG. 6). The ON duration of the blocking oscillation is determined by the time constant of the activation resistor R1 and the capacitor C2, while the OFF duration is determined by a load. The heavier the load is, the shorter the blocking oscillation period becomes. With the DC voltage output shorted, the output current reaches its maximum (point designated by C in FIG. 6).

In this way, the output current reaches its maximum with the DC voltage output shorted. In a case where the DC voltage output is shorted due to any abnormality or short mode fault in the load of apparatus mounting the constant-voltage switching power supply, an overcurrent could flow where the short has taken place.

SUMMARY OF THE INVENTION

It is therefore an object of the invention to provide an overcurrent output protecting circuit which can prevent an overcurrent from being outputted when the short-circuit is occurred in the DC voltage output side.

In order to achieve the above object, according to the invention, there is provided a constant-voltage switching power supply, comprising:

a smoother, which converts an AC voltage supplied from an AC power source into a first DC voltage;

a switching transistor, which converts the first DC voltage into a first cyclic pulse signal;

a transformer, which voltage-transforms the first cyclic pulse signal to obtain a second cyclic pulse signal;

a rectifier, which rectifies the second cyclic pulse signal to obtain a second DC voltage;

a detector, which detects a potential variation of the second DC voltage;

a duty ratio controller, which controls a duty ratio of the first cyclic pulse signal in accordance with the potential variation;

a duty ratio monitor, which judges whether the duty ratio is a predetermined ratio or more; and a deactivator, which turns off the switching transistor in a case where the duty ratio monitor judges that the duty ratio is the predetermined ratio or more.

As the load connected to the output side of the constant-voltage switching power supply becomes heavier, the ON duty of the switching transistor accordingly increases. According to the above configuration, the switching transistor is turned off, so that the output of the first cyclic pulse signal to the transformer is halted in a case where the ON duty of the switching transistor, that is, the ON duty ratio is the predetermined ratio or more. This stops energy supply to the transformer, that is, before an overcurrent flows into the load.

Therefore, an overcurrent is prevented from flowing into the load even in a case where short-circuit occurs in the output side of the constant-voltage switching power supply.

Here, it is preferable that: the duty ratio monitor outputs a deactivation signal having a predetermined DC voltage, in a case where it is judged that the ON duty ratio is the predetermined ratio or more; and the deactivator maintains a base potential of the switching transistor at a deactivating potential at which the switching transistor is turned off, in a case where the duty ratio monitor outputs the deactivation signal.

Here, it is further preferable that the deactivator comprises a self holding circuit which maintains the base potential of the switching transistor at the deactivating potential even in a case where the duty ratio monitor stops outputting the deactivation signal, after the deactivator is once activated.

In a case where an overcurrent output is detected and the deactivator is activated, there is a high probability that some fault is present in the load. Thus, an overcurrent would be detected again after the constant-voltage switching power supply once returns to a state that no overcurrent is detected.

According to the above configuration, since it is possible to maintain a state where a current does not flow into the load, safer and more secure overcurrent output protection can be attained.

Here, it is also preferable that: the transformer comprises a first primary coil to which the first cyclic pulse signal is applied, a second primary coil at which a third cyclic pulse signal substantially as same as the first cyclic pulse signal is induced; and the duty ratio monitor monitors an ON duty ratio of the third cyclic pulse signal to judge whether the ON duty ratio of the first cyclic pulse signal is the predetermined ratio or more.

Here, it is preferable that: the duty ratio monitor comprises a CR integration circuit which integrates the third cyclic pulse signal to obtain an integrated output signal, and a first Zener diode in which a cathode is electrically connected to the CR integration circuit and an anode is electrically connected to the deactivator; and the integrated output signal is outputted from the anode to operate the deactivator in a case where the integrated output signal has a potential which is greater than a first Zener potential of the first Zener diode.

When the current flowing into the load increases, the ON duty of the third cyclic pulse signal induced in the second primary coil accordingly increases, so that the potential of the integrated output signal of the CR integration circuit also increases. Therefore, the potential of the integrated output signal reaches the first Zener potential to turn off the switching transistor before the overcurrent flows into the load.

It is further preferable that the duty ratio monitor comprises a second Zener diode which limits a current discharged from a capacitor in the CR integration circuit, in a case where a negative potential of the third cyclic pulse signal is less than a second Zener potential of the second Zener diode, so that the integrated output signal increases.

When the negative potential of the third cyclic pulse signal becomes less than the second Zener potential, the capacitor in the CR integration circuit is charged by way of the positive voltage of the third cyclic pulse signal while the current discharged from the capacitor in the CR integration circuit is limited. Thus, the discharge current of the capacitor decreases, so that the potential of the integrated output signal of the CR integration circuit rapidly increases to operate the deactivator.

Therefore, it is possible to immediately operate the deactivator when the negative potential of the third cyclic pulse signal becomes less than the second Zener potential.

This provides an advantage that it is possible to improve a response for protecting an overcurrent.

Furthermore, since the charging of the capacitor in the CR integration circuit is accelerated, a larger capacitor can be provided so that the freedom of setting of a time constant of the CR integration circuit is enhanced.

It is also preferable that a time constant of the CR integration circuit is so determined that the third cyclic pulse signal has a potential capable of operating the duty ratio controller, before the potential of the integrated output signal reaches the first Zener potential.

In a state where the DC output potential is low in a process where the DC output potential is increasing after the activation of the constant-voltage switching power supply, the potential in the second primary coil is also low. Thus, the capacitor in the CR integration circuit is charged at the time constant thereof thus increasing the potential of the integrated output signal of the CR integration circuit. When the potential in the second primary coil has increased enough to drive the duty ratio controller, switching operation starts and the capacitor in the CR integration circuit repeats charging and discharging, which gradually decreases the potential of the integrated output signal of the CR integration circuit until a certain voltage value is reached. At the activation of the constant-voltage switching power supply, in a case where the potential of the integrated output signal of the CR integration circuit has increased to reach the first Zener potential, the deactivator malfunctions and the switching operation would be halted.

By determining the time constant of the CR integration circuit as described the above, such a situation can be avoided.

Preferably, the switching transistor is a field effect transistor.

Since a field-effect transistor can operate by a smaller current than that for a bipolar transistor, more stable switching operation and a more stable DC voltage output can be attained.

According to the invention, there is also provided an overcurrent output protector, electrically connected to a constant-voltage switching power supply which comprises a switching transistor converting a DC voltage obtained by smoothing an AC voltage supplied from an AC power source into a cyclic pulse signal, the overcurrent output protector comprising:

a duty ratio monitor, which judges whether an ON duty ratio of the cyclic pulse signal is a predetermined ratio or more; and a deactivator, which turns off the switching transistor in a case where the duty ratio monitor judges that the ON duty ratio is the predetermined ratio or more.

Here, it is preferable that: the duty ratio monitor outputs a deactivation signal having a predetermined DC voltage, in a case where it is judged that the ON duty ratio is the predetermined ratio or more; and the deactivator maintains a base potential of the switching transistor at a deactivating potential at which the switching transistor is turned off, in a case where the duty ratio monitor outputs the deactivation signal.

It is further preferable that the deactivator comprises a self holding circuit which maintains the base potential of the switching transistor at the deactivating potential even in a case where the duty ratio monitor stops outputting the deactivation signal, after the deactivator is once activated.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
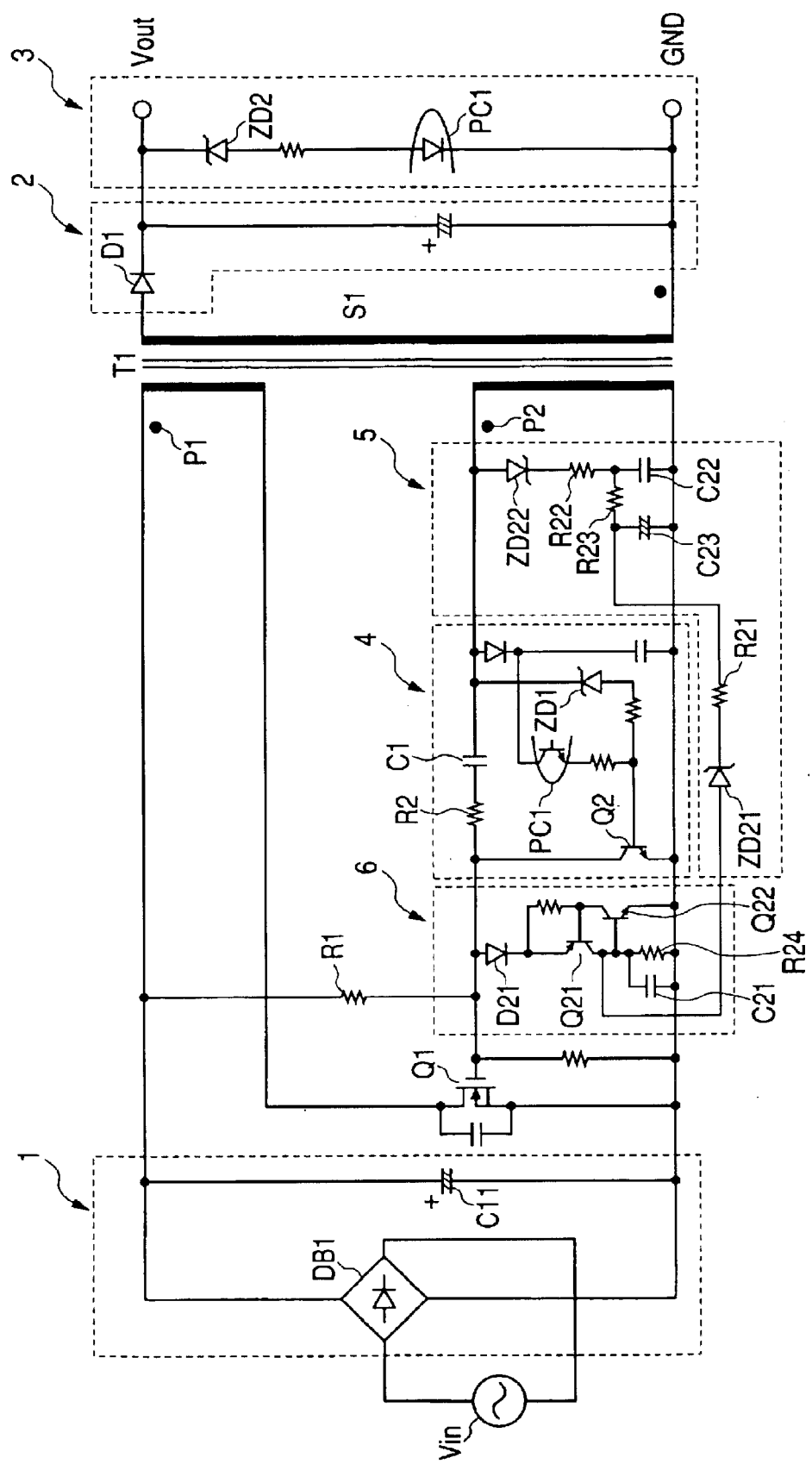
FIG. 1 is a circuit diagram showing a constant-voltage switching power supply according to one embodiment of the invention.

One preferred embodiment of the invention will be described referring to FIGS. 1 to 3. Components similar to those in the related-art configuration will be designated by the same reference numerals and detailed explanations for those will be omitted here.

In this embodiment, the switching transistor Q1 is a field-effect transistor. The field-effect transistor can operate on a smaller current than that for a bipolar transistor thus allowing more stable switching operation and outputting a more stable DC voltage.

The constant-voltage switching power supply according to the embodiment comprises a duty ratio monitor 5 and a switching transistor deactivator 6 to constitute an overcurrent output protecting circuit. The duty ratio monitor 5 monitors the duty ratio of a high-frequency pulse output from the switching transistor Q1 and outputs a predetermined DC voltage to the switching transistor deactivator 6 when the ON duty ratio has exceeded a predetermined value. The switching transistor deactivator 6 operates on the DC voltage output from the duty ratio monitor 5 and maintains the base voltage of the switching transistor Q1 to a constant voltage at which the switching transistor Q1 stays off, when the DC voltage output from the duty ratio monitor 5 has exceeded a certain voltage value.

The duty ratio monitor 5 comprises a CR integration circuit including a capacitor C23 and a resistor R23, a Zener diode ZD21 for specifying the operating voltage of the switching transistor deactivator 6, and a Zener diode DZ22 for limiting a discharge current of the capacitor C23. In accordance with the high-frequency pulse (P2 in FIG. 2) induced in the second primary coil P2, the polarity of a voltage across the second primary coil P2 is reversed. Thus the voltage at the positive electrode, that is, the output voltage of the CR integration circuit is maintained at a constant positive voltage integrated with the time constant of the capacitor C23 and the resistor R23 while the capacitor C23 is repeating charging and discharging via the Zener diode ZD22, the resistor R22, and the resistor R23.

Figure 2:
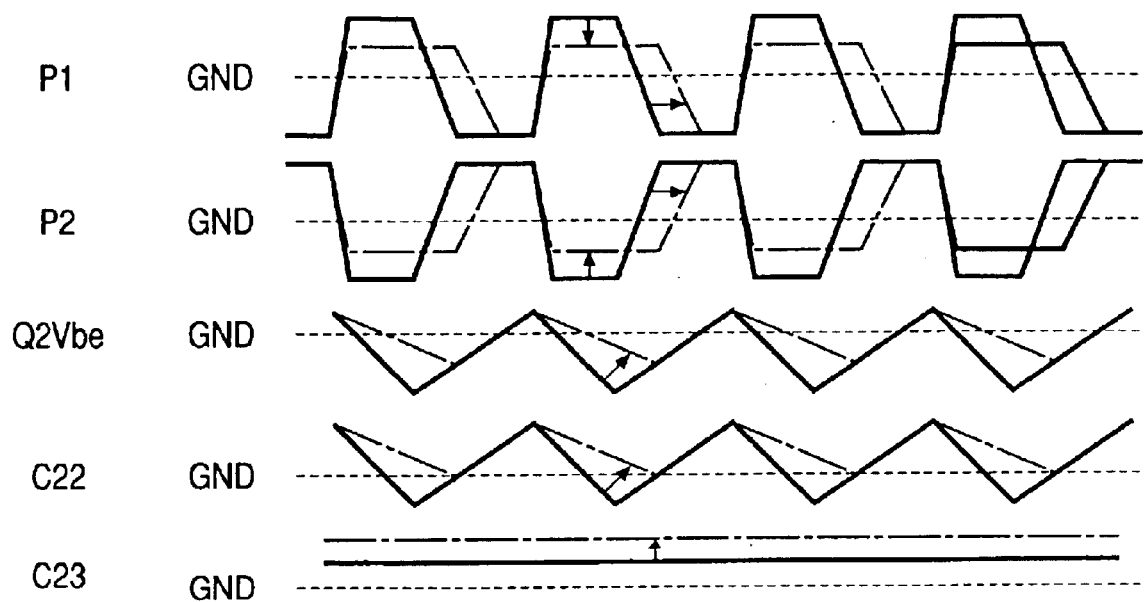
FIG. 2 is a graph showing the voltage waveforms of essential portions of the constant-voltage switching power supply.
Figure 3:
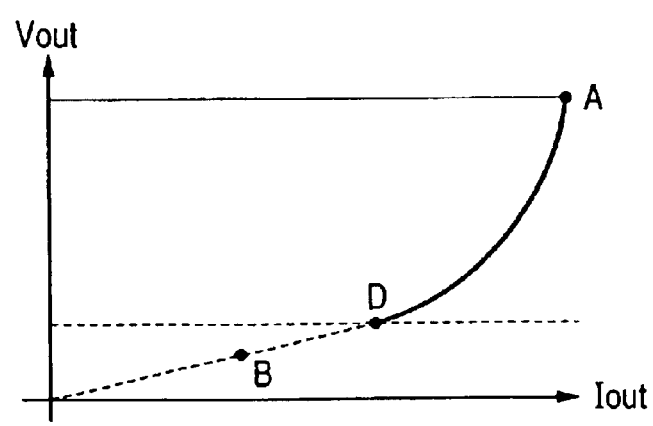
FIG. 3 is a graph showing a relationship between a DC output current and a DC output voltage in the constant-voltage switching power supply.
Figure 4:
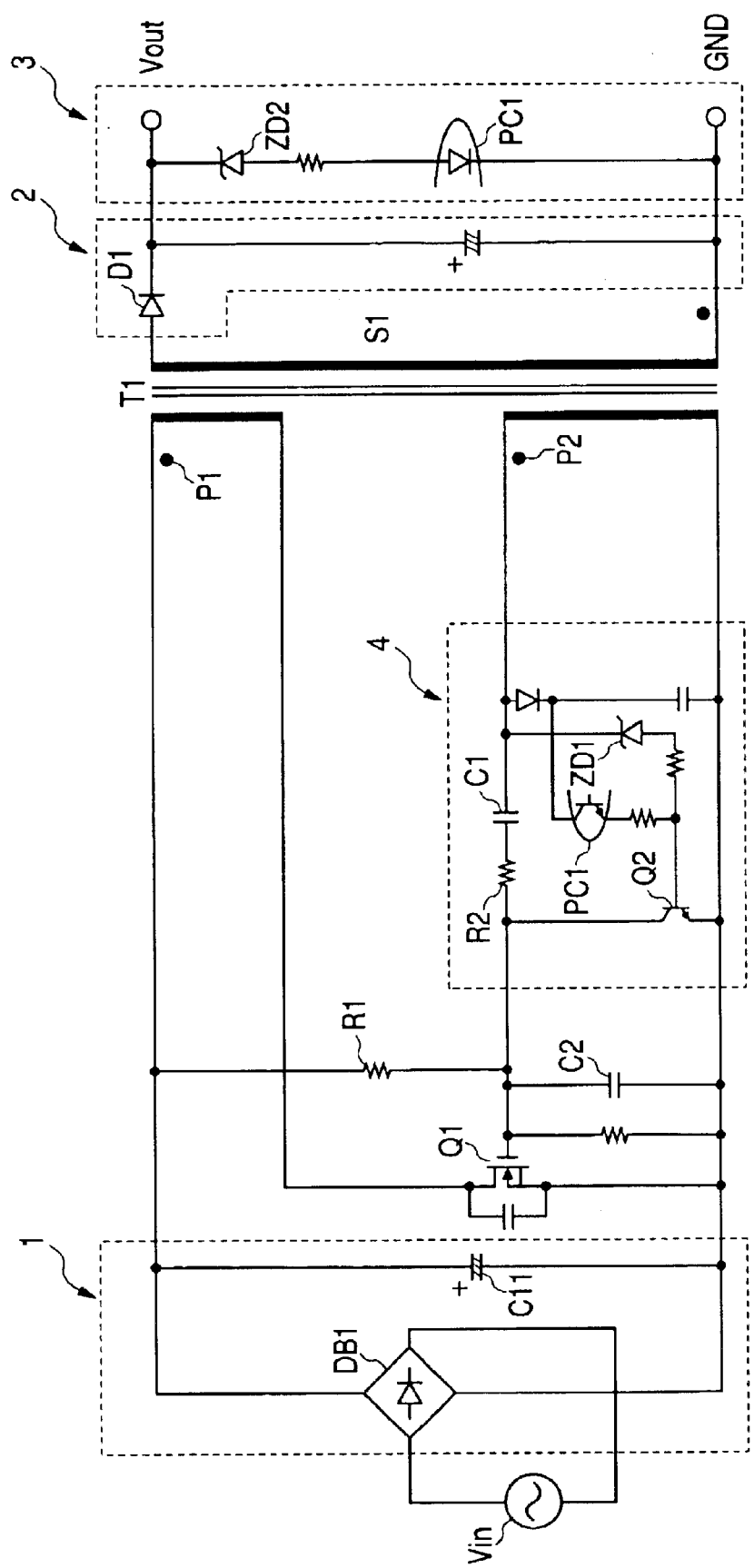
FIG. 4 is a circuit diagram showing a related-art constant-voltage switching power supply.
Figure 5:
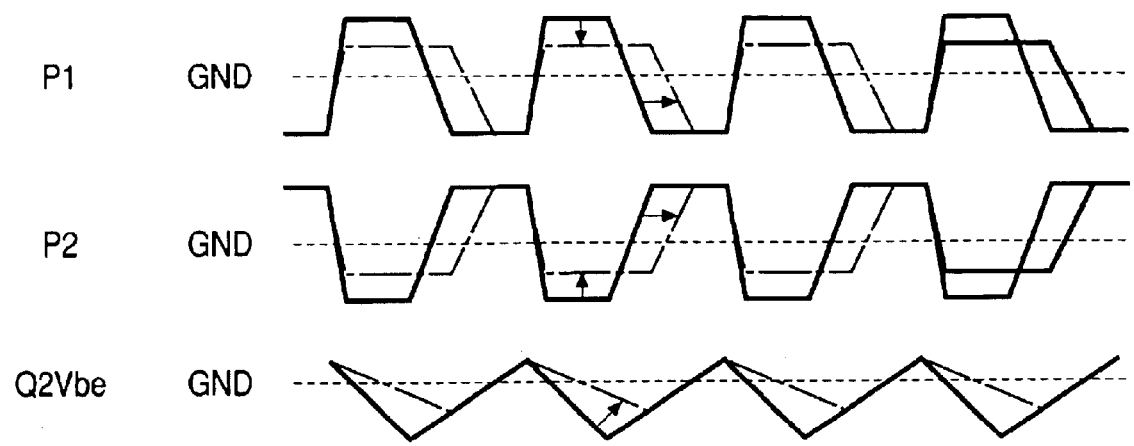
FIG. 5 is a graph showing the voltage waveforms of essential portions of the related-art constant-voltage switching power supply.
Figure 6:
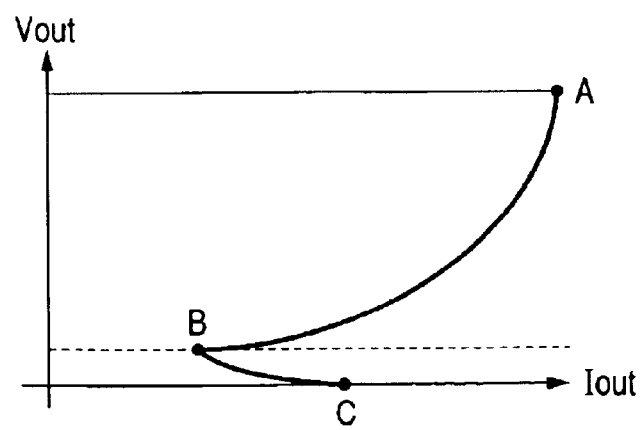
FIG. 6 is a graph showing a relationship between a DC output current and a DC output voltage in the related-art constant-voltage switching power supply.

Changing the load connected to the DC output terminal Vout from infinity to zero extends the ON duty of the duty ratio of a high-frequency pulse output from the switching transistor Q1 (P1 in FIG. 2). That is, the ON duty ratio increases. When a certain length of ON duty is reached, the base of the transistor Q2 is charged even in a case where the photocoupler PC1 is not turned on, which decreases the DC output voltage (point designated by A in FIG. 3).

As the DC output voltage Vout decreases, the ON duty voltage of the switching transistor Q1, that is, the ON-duty voltage of a voltage generated in the first primary coil P1 decreases (waveform indicated by a chained line of P1 in FIG. 2). This also causes the ON-duty voltage of a voltage generated in the second primary coil P2 to decrease (waveform indicated by a chained line of P2 in FIG. 2). The negative bias voltage of the transistor Q2 (voltage across base and emitter) decreases (waveform indicated by a chained line of Q2 Vbe in FIG. 2), which causes the transistor to tend to turn on.

Incidentally, the negative bias voltage of the capacitor C22 decreases (C22 in FIG. 2). Accordingly, the discharge current of the capacitor C23 decreases (C23 in FIG. 2), so that the output voltage of the CR integration circuit increases.

As the DC output voltage Vout further decreases, the voltage in the second primary coil P2 decreases. When it drops below the Zener voltage of the Zener diode ZD22, the discharge current of the capacitor C23 is limited by the Zener diode ZD22, which rapidly increases the output voltage of the CR integration circuit. This allows immediate activation of the switching transistor deactivator 6 even in a case where the current flowing into the DC voltage output terminal Vout has rapidly increased, thereby improving a response of protecting overcurrent output. The output voltage from the CR integration circuit exceeds the Zener voltage of the Zener diode ZD21 and the output voltage from the CR integration circuit is output on the anode of the Zener diode ZD21, which voltage operates the switching transistor deactivator 6. The resistor R21 is used to limit the current flowing in the Zener diode ZD21.

The switching transistor deactivator 6 operates on the DC voltage outputted from the duty ratio monitor 5, that is, the output voltage of the CR integration circuit outputted on the anode of the Zener diode ZD21, and maintains the base voltage of the switching transistor Q1 to a constant voltage at which the switching transistor Q1 is turned off. The transistor Q22 is turned on by the voltage outputted on the anode of the Zener diode ZD21. This turns on the transistor Q22, which turns on the transistor Q21. The gate of the switching transistor Q1 is discharged via the diode D21, the transistor Q21 and the transistor Q22. The voltage of the transistor Q1 decreases to a voltage at which the switching transistor Q1 stays off.

The switching transistor deactivator 6 is a self holding circuit. The collector current of the transistor Q21 flows into the base of the transistor Q22, which maintains the transistor Q22 in the ON state. Thus, even when the output voltage of the CR integration circuit has dropped below the Zener voltage of the Zener diode DZ21, the transistor Q21 and the transistor Q22 stays ON and the gate voltage of the switching transistor Q1 is maintained to a voltage at which the switching transistor Q1 stays OFF. The capacitor C21 is used to prevent malfunction of the switching transistor deactivator 6.

The capacitance of the capacitor C23 and the resistance of the resistor R23 in the CR integration circuit and the Zener voltages values of the Zener diode ZD21 and the Zener diode ZD22 are set so that the switching transistor deactivator 6 will operate (point designated by D in FIG. 3) before the voltage in the second primary coil P2 drops below the Zener voltage of the Zener diode ZD1, thus no longer capable of continuously driving the switching transistor Q1, which causes the switching transistor Q1 to start blocking oscillation (point designated by B in FIG. 3).

The time constant of the CR integration circuit is set based on the capacitance of the capacitor C23 and the resistance of the resistor R23 at the activation of the constant-voltage switching power supply so that the voltage in the second primary coil P2 will reach a voltage high enough to drive the duty ratio controller 4 before the output voltage of the CR integration circuit reaches the Zener voltage of the Zener diode ZD21. By doing so, it is possible to prevent the switching transistor deactivator 6 from malfunctioning, and halting the switching operation, thus preventing the failure to activate the constant-voltage switching power supply.

The time constant of the CR integration circuit is preferably set to a smaller value as long as the switching transistor deactivator 6 does not malfunction at the activation of the constant-voltage switching power supply. This is because the switching operation of the switching transistor Q1 can be immediately halted in a case where the short-circuit occurs in the DC output voltage side. It is necessary to note the combined resistance of the resistor R21, the resistor R23, and the resistor R24 so that the current necessary for the transistor Q22 to turn on will be supplied to the base of the transistor Q22.

In this way, when the short-circuit occurs in the DC voltage output side of the constant-voltage switching power supply, a high-frequency pulse caused by the switching operation of the switching transistor Q1 is no longer generated, which prevents an overcurrent from flowing into the DC voltage output side.

The invention is not limited to the foregoing embodiments but various modifications may be made to the invention without departing from the scope of the invention described in the claims.

For example, the switching transistor Q1 may be a bipolar transistor. The bipolar transistor has larger power consumption than a field-effect transistor and shows slightly poorer switching characteristics. However, the bipolar transistor is less costly and reduces the total cost of the constant-voltage switching power supply.

What is claimed is:

1. A constant-voltage switching power supply, comprising:
    a smoother, which converts an AC voltage supplied from an AC power source into a first DC voltage;
    a switching transistor, which converts the first DC voltage into a first cyclic pulse signal;
    a transformer, which voltage-transforms the first cyclic pulse signal to obtain a second cyclic pulse signal;
    a rectifier, which rectifies the second cyclic pulse signal to obtain a second DC voltage;
    a detector, which detects a potential variation of the second DC voltage;
    a duty ratio controller, which controls an ON duty ratio of the first cyclic pulse signal in accordance with the potential variation;
    a duty ratio monitor, which judges whether the ON duty ratio is a predetermined ratio or more; and
    a deactivator, which turns off the switching transistor in a case where the duty ratio monitor judges that the ON duty ratio is the predetermined ratio or more.

2. The constant-voltage switching power supply as set forth in claim 1, wherein:
    the duty ratio monitor outputs a deactivation signal having a predetermined DC voltage, in a case where it is judged that the ON duty ratio is the predetermined ratio or more; and
    the deactivator maintains a base potential of the switching transistor at a deactivating potential at which the switching transistor is turned off, in a case where the duty ratio monitor outputs the deactivation signal.

3. The constant-voltage switching power supply as set forth in claim 1, wherein:
    the transformer comprises a first primary coil to which the first cyclic pulse signal is applied, a second primary coil at which a third cyclic pulse signal substantially as same as the first cyclic pulse signal is induced; and
    the duty ratio monitor monitors an ON duty ratio of the third cyclic pulse signal to judge whether the ON duty ratio of the first cyclic pulse signal is the predetermined ratio or more.

4. The constant-voltage switching power supply as set forth in claim 3, wherein:
    the duty ratio monitor comprises a CR integration circuit which integrates the third cyclic pulse signal to obtain an integrated output signal, and a first Zener diode in which a cathode is electrically connected to the CR integration circuit and an anode is electrically connected to the deactivator; and
    the integrated output signal is outputted from the anode to operate the deactivator in a case where the integrated output signal has a potential which is greater than a first Zener potential of the first Zener diode.

5. The constant-voltage switching power supply as set forth in claim 4, wherein the duty ratio monitor comprises a second Zener diode which limits a current discharged from a capacitor in the CR integration circuit, in a case where a negative potential of the third cyclic pulse signal is less than a second Zener potential of the second Zener diode, so that the integrated output signal increases.

6. The constant-voltage switching power supply as set forth in claim 4, wherein a time constant of the CR integration circuit is so determined that the third cyclic pulse signal has a potential capable of operating the duty ratio controller, before the potential of the integrated output signal reaches the first Zener potential.

7. The constant-voltage switching power supply as set forth in claim 2, wherein the deactivator comprises a self holding circuit which maintains the base potential of the switching transistor at the deactivating potential even in a case where the duty ratio monitor stops outputting the deactivation signal, after the deactivator is once activated.

8. The constant-voltage switching power supply as set forth in claim 1, wherein the switching transistor is a field effect transistor.

9. An overcurrent output protector, electrically connected to a constant-voltage switching power supply which comprises a switching transistor converting a DC voltage obtained by smoothing an AC voltage supplied from an AC power source into a cyclic pulse signal, the overcurrent output protector comprising:

a duty ratio monitor, which judges whether an ON duty ratio of the cyclic pulse signal is a predetermined ratio or more; and a deactivator, which turns off the switching transistor in a case where the duty ratio monitor judges that the ON duty ratio is the predetermined ratio or more.

10. The overcurrent output protector as set forth in claim 9, wherein:

the duty ratio monitor outputs a deactivation signal having a predetermined DC voltage, in a case where it is judged that the ON duty ratio is the predetermined ratio or more; and the deactivator maintains a base potential of the switching transistor at a deactivating potential at which the switching transistor is turned off, in a case where the duty ratio monitor outputs the deactivation signal.

11. The overcurrent output protector as set forth in claim 10, wherein the deactivator comprises a self holding circuit which maintains the base potential of the switching transistor at the deactivating potential even in a case where the duty ratio monitor stops outputting the deactivation signal, after the deactivator is once activated.

* * * * *